United States Patent
Berne

(10) Patent No.: US 11,807,168 B2
(45) Date of Patent: Nov. 7, 2023

(54) WING FOLDING MECHANISM FOR A DEVICE ATTACHED OUTSIDE A VEHICLE

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 665 days.

(21) Appl. No.: 17/040,184

(22) PCT Filed: Mar. 23, 2018

(86) PCT No.: PCT/EP2018/057437
§ 371 (c)(1),
(2) Date: Sep. 22, 2020

(87) PCT Pub. No.: WO2019/179631
PCT Pub. Date: Sep. 26, 2019

(65) Prior Publication Data
US 2021/0009039 A1    Jan. 14, 2021

(51) Int. Cl.
*B60R 1/074* (2006.01)
*B60R 1/06* (2006.01)
*G03B 17/56* (2021.01)

(52) U.S. Cl.
CPC ............ *B60R 1/074* (2013.01); *B60R 1/0617* (2013.01); *G03B 17/561* (2013.01)

(58) Field of Classification Search
CPC .............................. B60R 1/074; B60R 1/0617
See application file for complete search history.

(56) References Cited

U.S. PATENT DOCUMENTS

| 3,107,077 A | 10/1963 | Lassa |
| 5,984,483 A | 11/1999 | Mazurek et al. |
| 2009/0080096 A1* | 3/2009 | Fimeri .................... B60R 1/074 359/841 |

FOREIGN PATENT DOCUMENTS

| EP | 0879738 A2 | 11/1998 |
| WO | 00/47447 A1 | 8/2000 |
| WO | 2017/164067 A1 | 9/2017 |

OTHER PUBLICATIONS

International Search and Written Opinion for International Application No. PCT/EP2018/057437, dated Nov. 12, 2018, 10 pages.

* cited by examiner

*Primary Examiner* — Ryan D Howard
(74) *Attorney, Agent, or Firm* — Withrow & Terranova, PLLC

(57) ABSTRACT

Mechanism (1) to support at least one device (7) installed outside a vehicle (2), the mechanism (1) comprising: —a support base (3) fixed on the vehicle (2), —a wing (6) pivotally attached to the support base (3), the at least one device (7) being fixed to the wing, —a driving module (4) movably attached to the support base (3), —the support base (3) comprising a cam (8) enabling a linear displacement of the driving module (4) along the cam (8), —an arm (5) having one extremity (9) connected to the driving module (4) and an other extremity (10) connected to the wing (6) so that the arm (5) drives the folding and/or unfolding of the wing (6) according to the displacement of the driving module (4) along the cam (8).

7 Claims, 2 Drawing Sheets

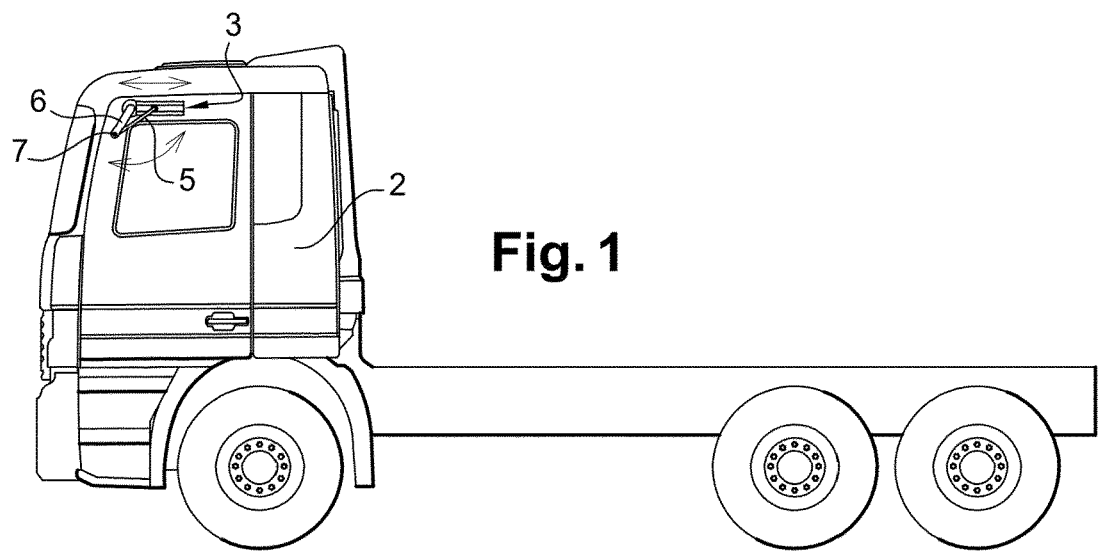
Fig. 1
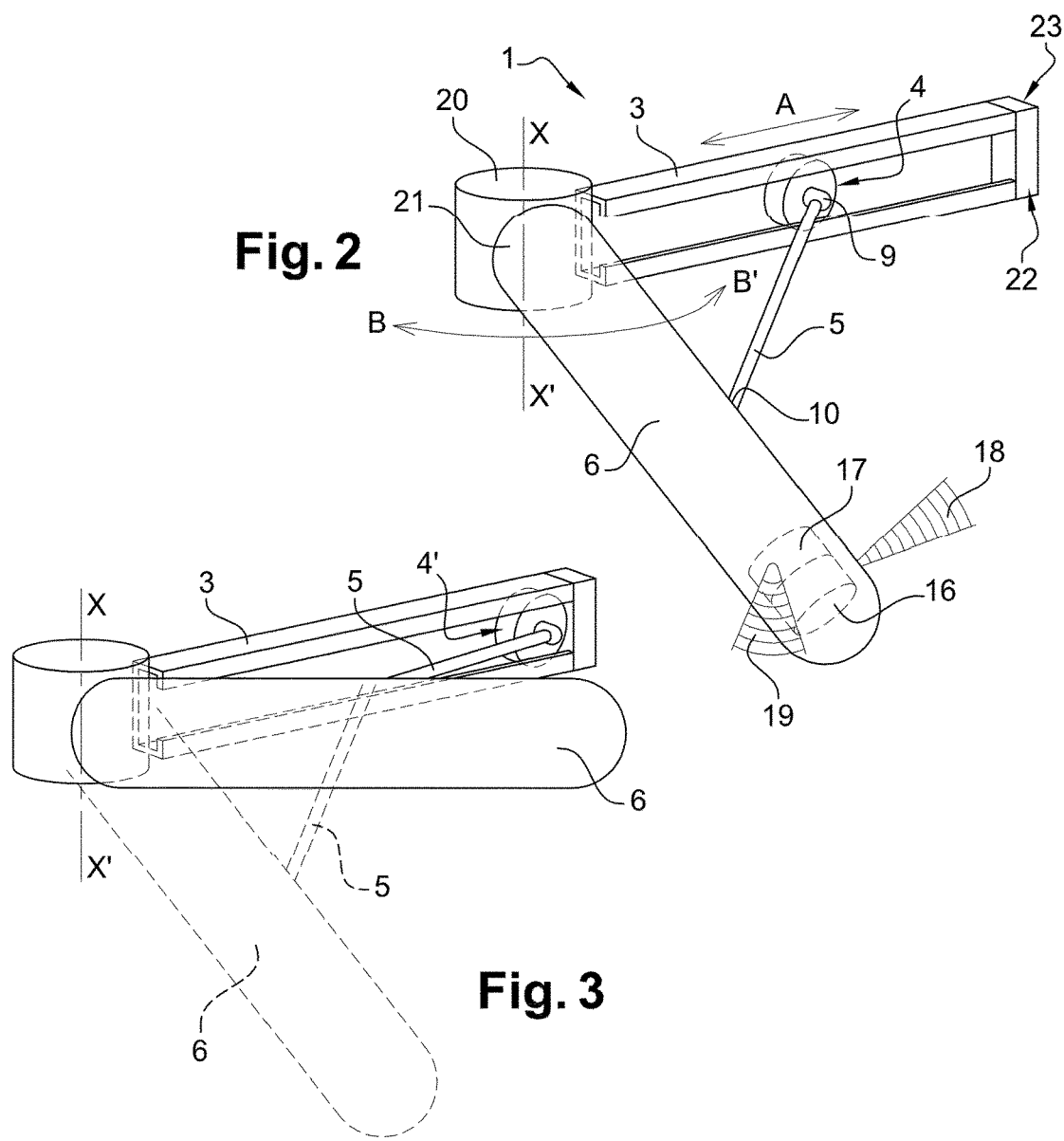
Fig. 2
Fig. 3

WING FOLDING MECHANISM FOR A DEVICE ATTACHED OUTSIDE A VEHICLE

This application is a 35 USC 371 national phase filing of International Application No. PCT/EP2018/057437, filed Mar. 23, 2018, the disclosure of which is incorporated herein by reference in its entirety.

TECHNICAL FIELD

The invention relates to the field of folding mechanism for devices attached outside a vehicle.

BACKGROUND

It is known to have some devices, such as rear view mirrors, or cameras, attached outside of a vehicle, and extending significantly outward from the body of the vehicle on which it is attached. It is known to have a folding away mechanism which protects the device from being damaged by some external object being on the trajectory of the device. Conventional folding mechanism rely on a first element, supporting the device, and pivotally attached to a second element fixed to the body of the vehicle, so that the first element is pivoted about a pivot axis to fold away the device supported by the first element when the first element encounters a force greater than a predetermined threshold.

There is a need to optimize the folding mechanism so that effect of vibrations due to the car is minimum on the device in operation, and in order to have a better control of the folding behaviour.

SUMMARY

An object of the invention is to provide a solution to this problem.

The present invention provides a mechanism to support at least one device installed outside a vehicle, the mechanism comprising:
- a support base fixed on the vehicle,
- a wing pivotally attached to the support base, the at least one device being fixed to the wing,
- a driving module movably attached to the support base, the support base comprising a cam enabling a linear displacement of the driving module along the cam,
- an arm having one extremity connected to the driving module and another extremity connected to the wing so that the arm drives the folding and/or unfolding of the wing according to the displacement of the driving module along the cam.

According to an embodiment of the mechanism, the connection between the end of arm and the driving module is configured to maintain the arm 5 in a plan.

According to these provisions, the arm contributes not only to drive the rotation of the wing, but it contributes also to increase the stability of the wing which is supporting the camera; according to these provisions, the wing is not resting, with one end only, on the support base, as in prior art, but the wing is further supported by the arm, so that effect of vibrations on the devices carried by the wing are reduced. As compared to conventional folding mechanism, mechanical stability of the wing, in the folding mechanism according to the invention, is improved by the wing being pivotally attached to the vehicle at one end of the support base, and to the arm at a second point; improvement is increased when the length of the wing is increased.

According to an embodiment, the at least one device comprises at least a camera, and/or at least a rear view mirror.

According to these provisions the wing is supported strongly enough to limit effect of vibration on the at least one camera or on the at least one rear view mirror and on the images acquired by the at least one camera and displayed on a display device.

According to an embodiment, the driving module comprises a motor and a gear, the motor being configured to drive the gear, and the gear being configured to cooperate with the cam, so that when the motor drives the gear the driving module is displaced along the cam.

According to an embodiment, the support base and the wing are fixed on a roof of a cabin of the vehicle or above the driver and/or the passenger's window.

According to an embodiment, the driving module is configured to take a predetermined position, wherein the wing is unfolded, to operate the device.

According to these provisions the wing holding the device can be set at the requested angle depending on the device, the legislation and the driver's need.

According to an embodiment, the driving module is configured to take a predetermined position, wherein the wing is folded, when the wing encounters a force which is above a threshold.

According to an embodiment, the driving module comprises a free wheel mechanism configured to cooperate with the motor and the gear, so that the motor becomes free to move along the cam, when the wing encounters a force which is above a threshold.

According to an embodiment, the extremity of the arm is connected to the driving module with a first attachment means and/or the other extremity of the arm is connected to the wing with another attachment means, the first attachment means and/or the other attachment means being configured to detach when the wing encounters a force which is above a threshold.

According to these provisions the wing holding the device monitoring system can fold if there is a risk of damage of the wing, and/or of the device, and/or an external object;

Further advantages and advantageous features of the invention are disclosed in the following description and in the dependent claims.

BRIEF DESCRIPTION OF THE DRAWINGS

Below follows a more detailed description of embodiments of the invention cited as examples, in reference to the figures, wherein like numbers denote like parts throughout the several views.

FIG. 1 is a schematic representation of the mechanism fixed on a vehicle.

FIG. 2 is a schematic representation of the mechanism in its operational position.

FIG. 3 is a schematic representation of the mechanism in its folded position.

DETAILED DESCRIPTION OF EXAMPLE EMBODIMENTS OF THE INVENTION

Figure 4:
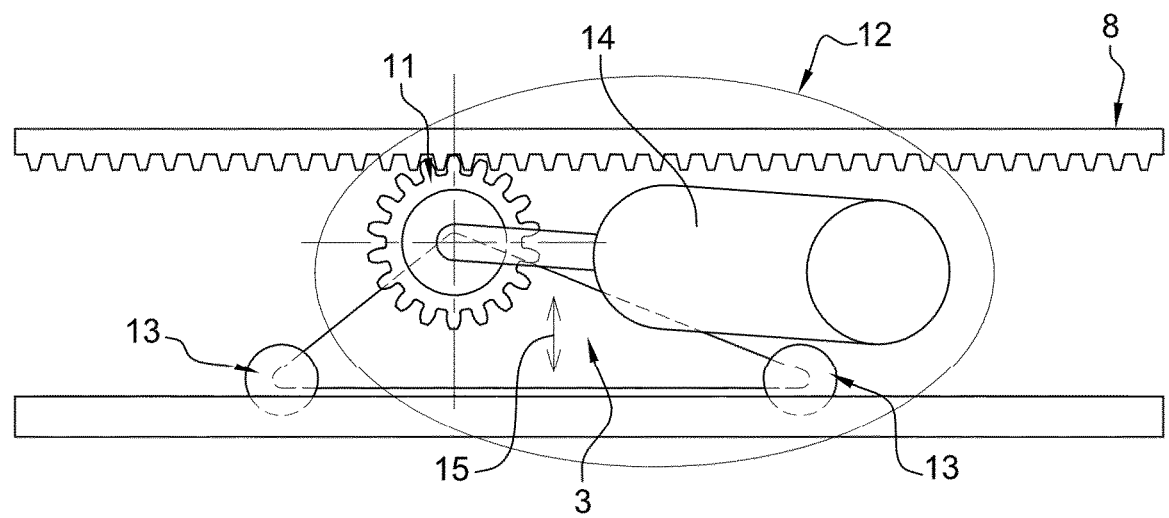
FIG. 4 is a schematic representation of a driving module.

FIGS. 2 and 3 illustrate a folding mechanism 1 according to an embodiment of the invention. The folding mechanism 1 is designed to support devices 7 such as a rear view mirror and/or a camera 16, 17 to be installed outside a vehicle, as illustrated on FIG. 1, so that the field of view 18, 19 of each device 7, 16, 17 is directed towards one or more observation areas, according to local regulations, when the folding mechanism is in its operational, namely unfolded, position.

FIG. 2 illustrates the folding mechanism 1 when it is in its unfolded, operational position.

FIG. 3 illustrates the folding mechanism 1 when it is folded.

As illustrated on FIG. 2, the folding mechanism 1 comprises a support base 3 fixed on the vehicle 2, and a wing 6 pivotally attached to the support base 3, the at least one device 7, 16, 17 being fixed to the wing.

According to this example embodiment of the invention, the support base 3 is a rigid part having a longitudinal extension along axis A; the support base 3 is configured to cooperate with a driving module 4 movably attached to the support base 3, so that the driving module 4 can be displaced linearly in two opposite directions along axis A.

An end 21 of wing 6 is pivotally attached to an end 20 of the support base 3, so that the wing can freely rotate around an axis XX' which is transverse to the extension axis A of the support base 3. The rotation of the wing around axis XX' may be either clockwise B or counterclockwise B'.

At the other end 23 of the support base 3, an end cap 22 is placed, to stop the displacement of the driving module 4 along axis A, in the direction of this end 23.

According to an embodiment of the folding mechanism 1, the folding mechanism further comprises an arm 5 having one end 9 connected to the driving module 4 and another end 10 connected to the wing 6, so that the arm 5 drives the rotation of the wing around axis XX'.

When the driving module 4 is displaced linearly along axis A towards the end 23 of the support base 3, the arm pulls the wing 6, which rotates counterclockwise B', until the driving module 4 is stopped by the end cap 22 at a position 4' of the driving module, so that the folding mechanism 1 is in its folded position, as illustrated in FIG. 3.

When the driving module 4 is displaced linearly along axis A towards the end 20 of the support base 3, the arm pushes the wing 6, which rotates clockwise B, until the driving module 4 is stopped at a predetermined position, so that the folding mechanism 1 is in its unfolded operational position, as illustrated in FIG. 2.

According to an embodiment of the folding mechanism 1, the driving module 4 comprises a housing 12, wherein a motor 14 and a gear 11 are lodged, as illustrated in FIG. 4. The motor 14 is configured to drive the gear 11; the gear is configured to mesh with a cam 8 parallel to the axis A, the cam 8 having a longitudinal extension along axis A, and being an integral part of, or attached to the support base 3.

When the motor 14 is driving the gear one way, the driving module 4 is displaced linearly along the cam 8 towards the end 23, and when the motor 14 is driving the gear the opposite way, the driving module 4 is displaced linearly along the cam 8 towards the opposite end 20.

Thus, the driving module 4 drives the folding or the unfolding of the folding mechanism 1. The driving module 4 displaces linearly, and drives the rotation of the wing 6, thanks to the arm 5.

According to an embodiment of the folding mechanism 1, the arm 5 and the wing 6 are in a same plan, transverse to axis XX', and the connection between the end 9 of arm 5 and the driving module 4 is configured to maintain the arm 5 in this plan, and to let the arm rotate freely around the connection point in this plan.

According to these provisions, the arm 5 contributes not only to drive the rotation of the wing 6, but it contributes also to reinforce the stability of the wing 6 which is supporting the camera 7, 16, 17; according to these provisions, the wing 6 is not resting, with one end 21 only, on the support base 3 as in prior art, but the wing 6 is further supported by the arm 5, so that effect of vibrations on the devices carried by the wing, and on displayed images produced by these devices, is limited. As compared to conventional folding mechanism, mechanical stability of the wing 6, in the folding mechanism 1 according to the invention, is improved by the wing being pivotally attached to the vehicle 2 at one end 20 of the support base 3, and to the arm at a second point 10.

Figure 5:
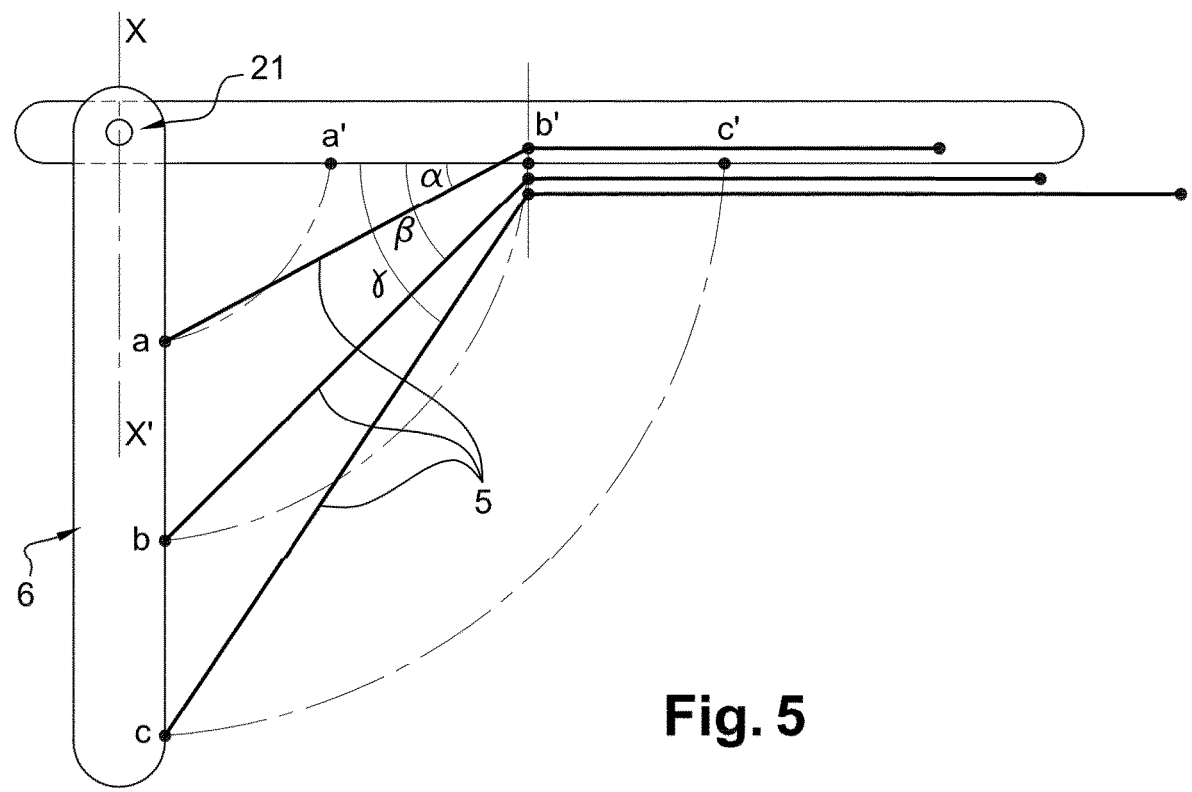
FIG. 5 illustrates three exemplary configurations of the arm with respect to the wing of the folding mechanism.

As illustrated by FIG. 5, different configurations of the arm with respect to the wing are possible. In FIG. 5, three exemplary configurations of the arm 5 are represented.

In a first exemplary configuration, the extremity 10 of the arm 5 is attached to the wing at point a close to the rotation axis of the wing. In the unfolded position of the wing, axis A of the support base 3 and the arm 5 form an angle α. When folding the wing, this point a rotates to point a' along the support base 3, such that when the wing is in its folded position angle α is 0 or approximately 0.

In a second exemplary configuration, the extremity 10 of the arm 5 is attached to the wing at point c which is closer to the wing free end than to the rotation axis of the wing. In the unfolded position of the wing, axis A of the support base 3 and the arm 5 form an angle γ. When folding the wing, this point c rotates to point c' along the support base 3, such that when the wing is in its folded position angle γ is 0 or approximately 0.

In a third exemplary configuration, the extremity 10 of the arm 5 is attached to the wing at point b, at a median position between point a and point c on the wing. In the unfolded position of the wing, axis A of the support base 3 and the arm 5 form an angle β. When folding the wing, this point b rotates to point b' along the support base 3, such that when the wing is in its folded position angle β is 0 or approximately 0.

The position of attachment a, b, c and the link angle α, β, γ have an important impact on the wing stability and on the packaging of the cam, and corresponding positions a', b', c' are important to dimension the motor torque.

For example, depending on link position and angle, it will get easier or harder to move the wing and rotation management can be more or less precise.

According to an embodiment of the invention, the driving module 4 is configured to take a predetermined folded position 4' when the wing 6 encounters a force which is above a threshold.

According to an embodiment of the invention, the driving module 4 comprises a free wheel mechanism configured to cooperate with the motor 14 and the gear 11, so that the motor becomes free to move along the cam 8, when the wing 6 encounters a force which is above a threshold.

According to an embodiment of the invention, the extremity 9 of the arm 5 is connected to the driving module 4 with an attachment means such as a clips and/or the other extremity 10 of the arm 5 is connected to the wing 6 with another attachment means such as another clips, the attachment means being configured to detach when the wing 6 encounters a force which is above a threshold.

According to these provisions, the wing 6 holding the devices 7, 16, 17 can fold before damages may occur on the wing 6 and/or on the devices 7, 16, 17 due to a shock with an external object.

The invention claimed is:

1. A mechanism to support at least one device installed outside a vehicle, the mechanism comprising:
   a support base fixed on the vehicle,
   a wing pivotally attached to the support base, the at least one device being fixed to the wing,
   a driving module movably attached to the support base,
   the support base comprising a cam enabling a linear displacement of the driving module along the cam,
   an arm having one extremity connected to the driving module and another extremity connected to the wing so that the arm drives the folding and/or unfolding of the wing according to the displacement of the driving module along the cam,
wherein the driving module comprises a motor and a gear, the motor being configured to drive the gear, and the gear being configured to cooperate with the cam, so that when the motor drives the clear the driving module is displaced along the cam.

2. The mechanism of claim 1, wherein the at least one device comprises at least a camera, and/or at least a rear view mirror.

3. The mechanism of claim 1, wherein the support base and the wing are fixed on at least one of a roof of a cabin of the vehicle, above the driver's window, and/or above the passenger's window.

4. The mechanism of claim 1, wherein the driving module is configured to take a predetermined position, wherein the wing is unfolded, to operate the device.

5. The mechanism of claim 1, wherein the driving module is configured to take a predetermined position, wherein the wing is folded when the wing encounters a force which is above a threshold.

6. The mechanism of claim 5, wherein the driving module comprises a free wheel mechanism configured to cooperate with the motor and the gear, so that the motor becomes free to move along the cam when the wing encounters a force which is above a threshold.

7. The mechanism of claim 5, wherein the extremity of the arm is connected to the driving module with a first attachment and/or the other extremity of the arm is connected to the wing with another attachment, the first attachment and/or the other attachment being configured to detach when the wing encounters a force which is above a threshold.

* * * * *